(12) United States Patent
Benson et al.

(10) Patent No.: US 8,023,588 B1
(45) Date of Patent: Sep. 20, 2011

(54) ADAPTIVE PREDISTORTION OF NON-LINEAR AMPLIFIERS WITH BURST DATA

(75) Inventors: Jeremy Benson, Port Moody (CA); William D. Warner, Maple Ridge (CA); Paul V. Yee, Vancouver (CA)

(73) Assignee: PMC-Sierra, Inc., Santa Clara, CA (US)

( * ) Notice: Subject to any disclaimer, the term of this patent is extended or adjusted under 35 U.S.C. 154(b) by 721 days.

(21) Appl. No.: 12/099,369

(22) Filed: Apr. 8, 2008

(51) Int. Cl.
*H04K 1/02* (2006.01)
*H04L 25/03* (2006.01)

(52) U.S. Cl. ........ 375/297; 375/296; 375/295; 330/147; 330/75; 455/114.3; 455/114.2

(58) Field of Classification Search .................. 375/296, 375/297, 295; 330/149, 75; 455/114.2, 114.3
See application file for complete search history.

(56) References Cited

U.S. PATENT DOCUMENTS

| | | | |
|---|---|---|---|
| 5,903,823 A | 5/1999 | Moriyama et al. | |
| 5,990,734 A | 11/1999 | Wright et al. | |
| 5,990,738 A | 11/1999 | Wright et al. | |
| 6,054,894 A | 4/2000 | Wright et al. | |
| 6,054,896 A | 4/2000 | Wright et al. | |
| 6,246,286 B1 | 6/2001 | Persson | |
| 6,313,703 B1 | 11/2001 | Wright et al. | |
| 6,342,810 B1 | 1/2002 | Wright et al. | |
| 6,356,146 B1 | 3/2002 | Wright et al. | |
| 6,570,444 B2 | 5/2003 | Wright et al. | |
| 6,587,514 B1 | 7/2003 | Wright et al. | |
| 6,798,843 B1 | 9/2004 | Wright et al. | |
| 6,973,138 B1 | 12/2005 | Wright et al. | |
| 7,058,369 B1 | 6/2006 | Wright et al. | |
| 7,061,990 B2 | 6/2006 | Wright et al. | |
| 7,061,991 B2 | 6/2006 | Wright et al. | |
| 7,102,430 B2 | 9/2006 | Johnson et al. | |

(Continued)

FOREIGN PATENT DOCUMENTS

JP 2006-037831 2/1994

OTHER PUBLICATIONS

Dennis F. Rosenauer; DSP Based Transmitter Gain Control for Satellite Earth Stations with Multi-Carrier Burst Traffic; IEEE Pacific Rim Conference on Communications, Computers and Signal Processing; Jun. 1-2, 1989; pp. 475-477.

(Continued)

*Primary Examiner* — Phuong Phu
(74) *Attorney, Agent, or Firm* — Knobbe Martens Olson & Bear LLP

(57) ABSTRACT

Apparatus and methods control predistortion of an RF transmitter. A base station or a mobile station can utilize predistortion to improve linearity characteristics of the RF power amplifier. When used effectively, predistortion limits spectral growth such that the amplified signal complies with regulatory requirements. With respect to bursty signals, specific improvement techniques are disclosed. A first technique is related to adaptation using only a smaller subset of samples of a burst. A second technique is related to selective application of digital predistortion, such as, only under high power conditions for a power amplifier. A third technique is directed to adaptation of less than all of the coefficients. These improvements permit the use of a smaller and less expensive amplifier for a given power class and can lengthen battery life for a mobile unit.

54 Claims, 4 Drawing Sheets

U.S. PATENT DOCUMENTS

| | | | |
|---|---|---|---|
| 7,138,863 | B2 | 11/2006 | Persson |
| 7,177,603 | B1 | 2/2007 | Wright et al. |
| 7,200,367 | B1 | 4/2007 | Wright et al. |
| 7,260,365 | B1 | 8/2007 | Wright et al. |
| 7,295,815 | B1 | 11/2007 | Wright et al. |
| 7,340,223 | B1 | 3/2008 | Wright et al. |
| 7,409,011 | B2 | 8/2008 | Wright et al. |
| 2006/0018375 | A1 | 1/2006 | Wojtiuk |
| 2006/0098762 | A1 | 5/2006 | Wojtiuk |
| 2006/0158254 | A1 | 7/2006 | Johnson et al. |
| 2006/0178120 | A1 | 8/2006 | Puma |
| 2007/0042726 | A1 | 2/2007 | Ohba et al. |
| 2009/0033418 | A1* | 2/2009 | Ericson et al. ............ 330/149 |

OTHER PUBLICATIONS

Draxler, et al; Time Domain Characterization of Power Amplifiers with Memory Effects; Microwave Symposium Digest, 2003 IEEE MTT-S Digest; 2003; vol. 2; Jun. 8-13, 2003; pp. 803-806.

Draxler, et al; Memory Effect Evaluation and Predistortion of Power Amplifiers; Microwave Symposium Digest, 2005 IEEE MTT-S International; Jun. 12-17, 2005; pp. 1549-1552.

Safari, et al; A Block-Based Predistortion for High Power-Amplifier Linearization; IEEE Transaction on Microwave Theory and Techniques; Jun. 2006; pp. 2813-2820; vol. 54, No. 6.

* cited by examiner

ADAPTIVE PREDISTORTION OF NON-LINEAR AMPLIFIERS WITH BURST DATA

BACKGROUND

1. Field of the Invention

The invention generally relates to electronics, and in particular, to digital predistortion of RF power amplifiers.

2. Description of the Related Art

When an amplifier amplifies a signal that contains amplitude variations, the signal will become distorted if the amplifier does not exhibit a linear amplitude and phase transfer characteristic. This means that the output of the amplifier is not linearly proportional to the input of the amplifier. It will also suffer distortion if the phase shift introduced by the amplifier is not linear over the range of frequencies present in the signal or if the phase shift caused by the amplifier varies with the amplitude of the input signal. The distortion introduced includes inter-modulation of the components of the input signal. The products of the inter-modulation can appear within the bandwidth of the signal causing undesirable interference. They can also extend outside the bandwidth originally occupied by the signal. This can cause interference in adjacent channels and violate transmitter licensing and regulatory spectral emission requirements. Although filtering can be used to remove the unwanted out-of-band distortion, filtering is not always practical, especially when the amplifier is operates on several different frequencies.

Predistortion is a technology typically used for wireless broadband in both a mobile station and a base station. Recent air-interface standards, such as 802.16e (WiMAX), rely on the use of time-division duplex (TDD) in which the transmitter and receiver alternate operation in time. Amplifier predistortion on the transmitter of either the base station or the mobile station can be used to improve the spectral and constellation error performance at high power allowing the use of a smaller and less expensive amplifier for a given power class. A smaller amplifier will typically also consume less bias current, which improves the efficiency of the base station and lengthens the battery life of the mobile station.

SUMMARY OF THE DISCLOSURE

Embodiments of the invention address two problems that plague predistortion systems using a time-division duplex (TDD) air-interface: adaptive predistortion can perform poorly with burst data due to the variation of the amplifier nonlinearity over the course of the burst period; and mobile stations can have severe power restrictions, which reduces the amount of power that can be used to perform the predistortion function. In the context of this disclosure, a burst corresponds to a baseband frame, an intermediate frequency (IF) frame or an RF frame that is intended to be transmitted in a particular timeslot of a TDD system. The burst can contain a payload of data, as well as overhead, such as preambles and so forth.

Within a common theme of predistortion of bursty data as encountered in time-division duplex systems, 3 separate techniques are disclosed. These techniques can be applied independently of each other or can be combined.

A first technique is related to adaptation using only a smaller subset of samples of a burst.

A second technique is related to selective application of digital predistortion, such as, only under high power conditions for a power amplifier.

A third technique is directed to adaptation of less than all of the coefficients.

BRIEF DESCRIPTION OF THE DRAWINGS

These drawings and the associated description herein are provided to illustrate specific embodiments of the invention and are not intended to be limiting.

DETAILED DESCRIPTION OF SPECIFIC EMBODIMENTS

Although particular embodiments are described herein, other embodiments of the invention, including embodiments that do not provide all of the benefits and features set forth herein, will be apparent to those of ordinary skill in the art.

Embodiments are applicable to multiple signals and for any modulation scheme or combination of modulations. For example, when multiple signals are amplified, they can each have any modulation type.

Figure 1:
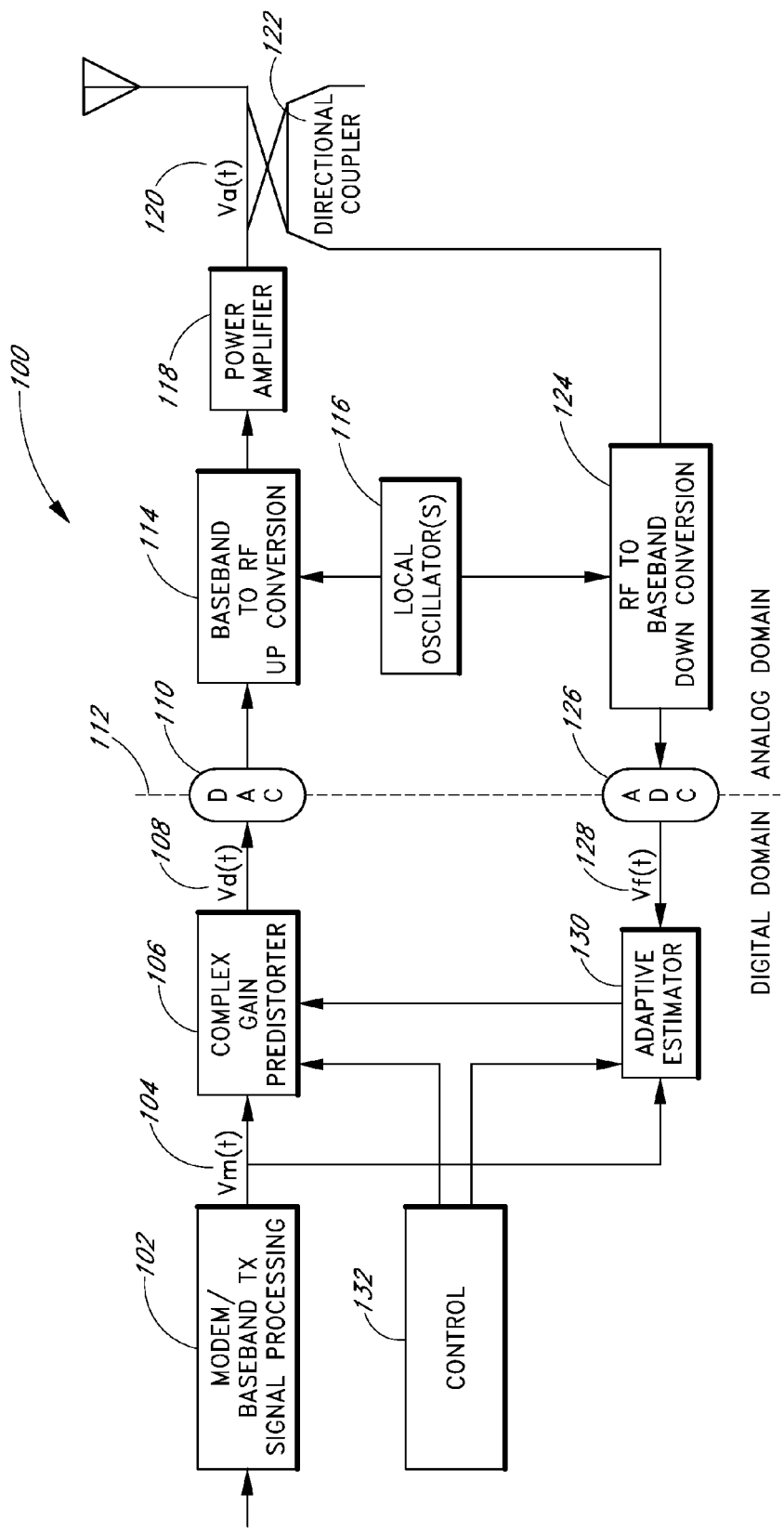
FIG. 1 illustrates an adaptive linearization circuit.

FIG. 1 illustrates an example of a configuration of an adaptive linearization circuit 100. It will be understood that some portions of the adaptive linearization circuit 100 can be implemented in hardware and other portions can be implemented in software. In FIG. 1, a feedback loop formed by an RF coupler 122, an RF to baseband down conversion circuit 124, and an analog-to-digital converter 126 has been added to a conventional power amplifier configuration. In the illustrated embodiment, the RF coupler 122 is a directional coupler. In one embodiment, the RF to baseband down conversion circuit 124 can correspond to a quadrature demodulator. The signal designations refer to the complex baseband signals or the complex envelope of the bandpass signals, and this notation is consistent with seminal work in the field, see J. K. Cavers, "Amplifier Linearization Using a Digital Predistorter with Fast Adaption and Low Memory Requirements," IEEE Trans. Veh. Technol., Vol. 39, pp. 374-383, November 1990. A dashed line 112 represents the boundary between the digital domain to the left and the analog domain to the right.

A complex gain predistorter (DCSP) 106 generates a baseband complex modulation envelope $V_d(t)$ 108 that anticipates and corrects for the non-linearities introduced by a power amplifier (PA) 118. An adaptive estimator 130 compares the desired complex modulation envelope of a reference signal $V_m(t)$ 104 with the complex modulation envelope of an observed signal $V_f(t)$ 128 that is derived from an actual output signal $V_a(t)$ 120 of the power amplifier 118. In response, the adaptive estimator 130 estimates the complex gain predistortion coefficients that are used by the complex gain predistorter (DCSP) 106. The observed signal $V_f(t)$ 128 is a scaled, rotated, and delayed version of the actual output signal $V_a(t)$ 120, and the complex modulation envelopes of the observed signal $V_f(t)$ 128 and of the actual output signal $V_a(t)$ 120 should correspondingly be similar. The characteristics of the complex gain predistorter (DCSP) 106 are selected such that its non-linearity is approximately complementary to that of the power amplifier 118.

The original modulation trajectory is mapped to a new trajectory in the complex modulation plane by the complex gain predistorter (DCSP) 106. This new trajectory is carefully selected such that upon amplification by the non-linear power amplifier 118, it is mapped back to the original and desired modulation trajectory. As a result, the distortion and intermodulation products at the actual output signal $V_a(t)$ 120 are reduced, since the actual output signal $V_a(t)$ 120 is now constrained to the spectral characteristics of the linear modulation scheme. The complex gain predistortion technique assumes that the power amplifier 118 may be characterized by memoryless amplitude-to-amplitude and amplitude-to-phase non-linearities. This amplifier characteristic is expressed in Equation 1.

$$V_a(t) = V_d(t) \cdot G\{|V_d(t)|^2\} \tag{Eq. 1}$$

In Equation 1, $V_d(t)$ and $V_a(t)$ are complex baseband representations of the instantaneous input and output complex modulation envelopes, respectively, of the power amplifier 118. A digital to analog converter (DAC) 110 converts the baseband complex modulation envelope $V_d(t)$ 108 from digital to analog. A baseband to RF up conversion circuit 114 receives a local oscillator signal from a local oscillator 116 and upconverts the baseband complex modulation envelope $V_d(t)$ 108 to RF. The baseband to RF up conversion circuit 114 can, for example, correspond to a quadrature upconverter/modulator. The complex gain $G\{|V_d(t)|^2\}$ defines the non-linear amplifier gain to be a function of instantaneous input amplitude. This eases the computation of the adaptive estimator 130, which determines the appropriate predistortion coefficients. The complex gain predistorter (DCSP) 106 is described by a similar complex gain equation expressed in Equation 2.

$$V_d(t) = V_m(t) \cdot F\{|V_m(t)|^2\} \tag{Eq. 2}$$

In Equation 2, $V_m(t)$ and $V_d(t)$ are complex baseband representations of the instantaneous input and output complex modulation envelopes, respectively, of the complex gain predistorter (DCSP) 106. A characteristic function, $F\{|V_m(t)|^2\}$, of the complex gain predistorter (DCSP) 106 is determined by the adaptive estimator 130 to minimize a loop error vector. One simplified example of the loop error vector is expressed in Equation 3 as the difference between the actual output signal $V_a(t)$ 120 of the power amplifier 118 and the reference signal $V_m(t)$ 104. It will be understood that there is a time delay between the actual output signal $V_a(t)$ 120 and the reference signal $V_m(t)$ 104 that is not shown in Equation 3. It will also be understood that the actual output signal $V_a(t)$ 120 may be observed by the adaptive estimator 130 via the observed signal $V_f(t)$ 128.

$$V_{error}(t) = V_a(t) - V_m(t) \tag{Eq. 3}$$

A direct link may be established between the loop error vector and characteristic function of the predistorter by eliminating $V_d(t)$ from Equation 1 and Equation 2, and then substituting for $V_a(t)$ in Equation 3. Thus, the error vector can be rewritten as expressed in Equation 4.

$$V_{error}(t) = V_m(t) \cdot F\{|V_m(t)|^2\} \cdot G\{|V_m(t) F\{|V_m(t)|^2\}|^2\} - V_m(t) \tag{Eq. 4}$$

Figure 2:
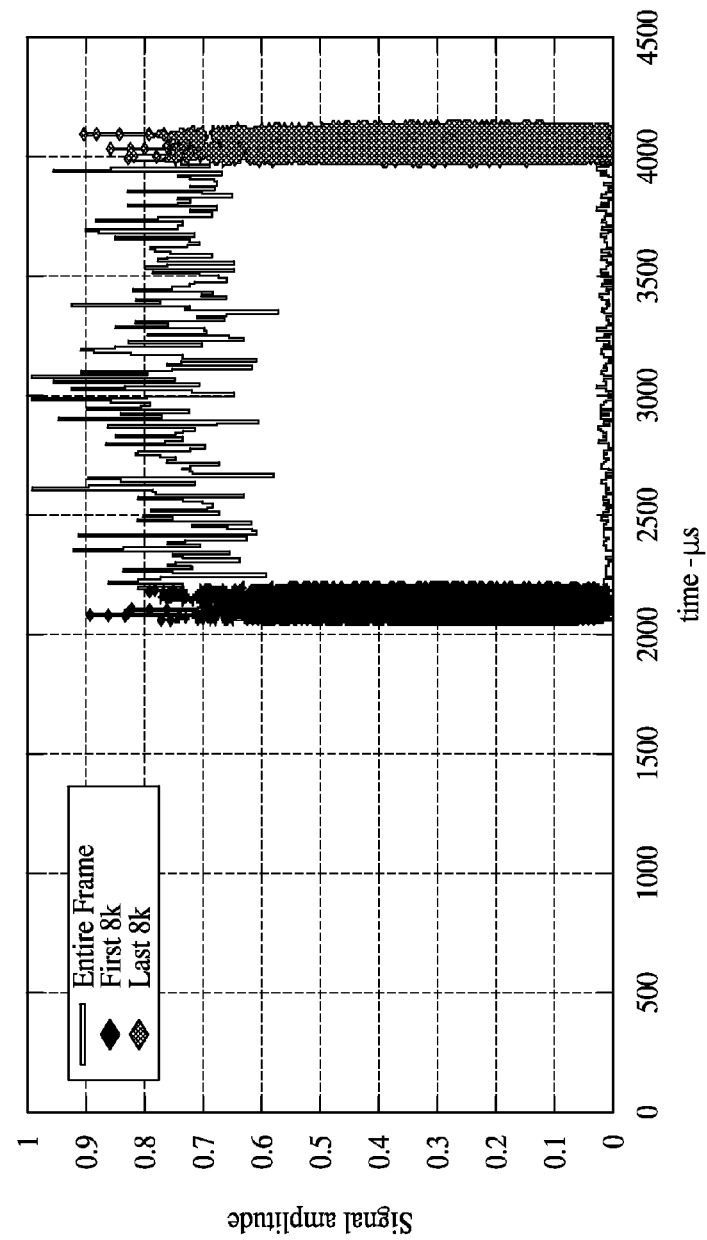
FIG. 2 illustrates a frame of time-division duplex (TDD) transmit data highlighting the adapted portions.

The task of the adaptive estimator 130 is to calculate the characteristic function $F\{|V_m(t)|^2\}$, of the predistorter 106 such that for a selected value of $V_m(t)$, the loop error vector, $V_{error}(t)$ is reduced and/or minimized, for example, zero. One method of representing the characteristic function, $F\{|V_m(t)|^2\}$, is to introduce a one-dimensional quantized lookup table, which is indexed by the modulus of the baseband complex modulation envelope. The annular rings shown in FIG. 2 are a direct consequence of this quantization, and it is assumed that the amplifier's AM-AM and AM-PM non-linear characteristics are relatively constant over the width of the annulus and are relatively invariant with phase.

While illustrated in the context of a lookup table, it will be understood by one of ordinary skill in the art that the principles and advantages described herein are applicable to other data storage techniques, such as a multidimensional data structure.

The corresponding table entry is a complex number representing the complex gain used to predistort the complex modulation envelope of the reference signal $V_m(t)$ 104 for that specific instantaneous amplitude. The effects of table size and quantization step have been studied, and it has been demonstrated that lookup tables of about 32 or 64 entries provide sufficient spectral control of a non-linear amplifier when used in conjunction with a 16-level quadrature amplitude modulation (QAM) scheme. See Cavers, id. However, since the power amplifier's non-linear characteristics are a function of temperature, frequency, operating point and aging, the contents of the lookup table should be continually updated to ensure accurate predistortion.

A linear convergence technique, known as rotate and scale (RASCAL), has been developed for the adaptive estimator 130. In one embodiment, the adaptive estimator 130 updates the predistortion lookup table by continually comparing the original complex modulation envelope of the reference signal $V_m(t)$ 104 with the observed signal $V_f(t)$ 128 or sampled feedback complex modulation trajectory. As previously mentioned, the feedback signal is a delayed version of the amplifier's output, $V_a(t)$, and this delay should be eliminated, i.e., compensated, before comparisons are made. To estimate and remove the delay, several techniques are available. See Y. Nagata, Linear Amplification Technique For Digital Mobile Communications, in proc. IEEE Veh. Technology. Conf., San Francisco, Calif., 1989, pp. 159-164. Also see E. A. Lee and D. G. Messerschmitt, Digital Communication, New York: Kluwer Academic, 1990 ch15, pp. 566-569. To effect the comparisons and update the lookup table, the loop error vector $V_{error}(t)$ is broken into magnitude and phase error equations as expressed below in Equations 5, 6, and 7.

$$V_{error}(t) = V_a(t) - V_m(t) = |V_{error}(t)| \cdot e^{-j\phi_{error}(t)} \tag{Eq. 5}$$

Upon converting Equation 5 to polar coordinates, two orthogonal error functions are expressed below in Equations 6 and 7.

$$e_{scale}(|V_m(t)|^2) = |V_a(t)| - |V_m(t)| \tag{Eq. 6}$$

$$e_{rotate}(|V_m(t)|^2) = arg(V_a(t)) - arg(V_m(t)) \tag{Eq. 7}$$

Figure 3:
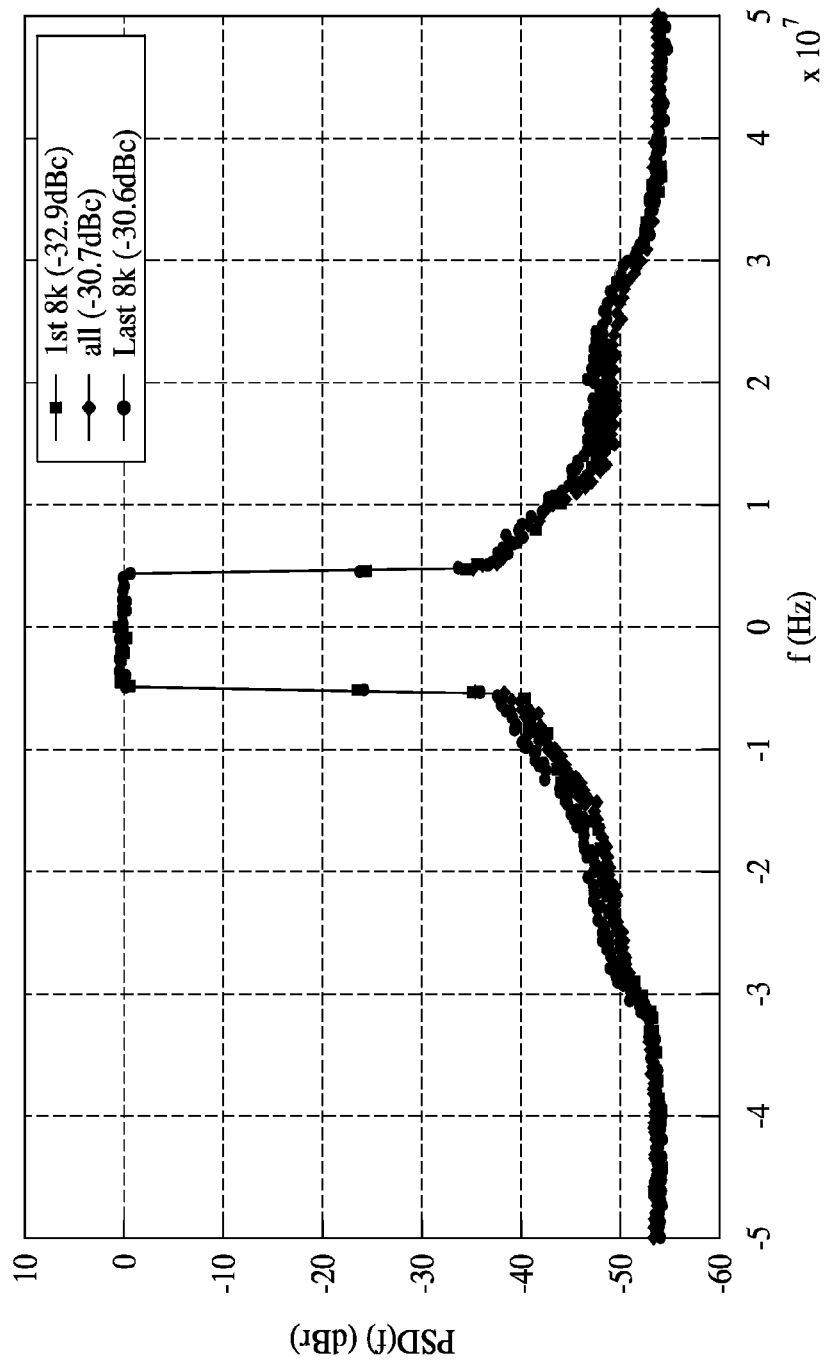
FIG. 3 illustrates spectral performance of three different capture mechanisms: first 8000 samples, last 8000 samples, all samples.

FIG. 3 provides a graphical interpretation of these error functions. For inputs to the amplifier with identical instantaneous signal amplitude, the scaling and rotational distortion (AM-AM and AM-PM) is predictable. Consequently, the adaptive estimator 130 seeks the correct complimentary rotation and scaling to compensate for the distortion of the amplifier. This can be achieved by employing an iterative linear convergence to minimize the error functions expressed in Equations 6 and 7.

Figure 4:
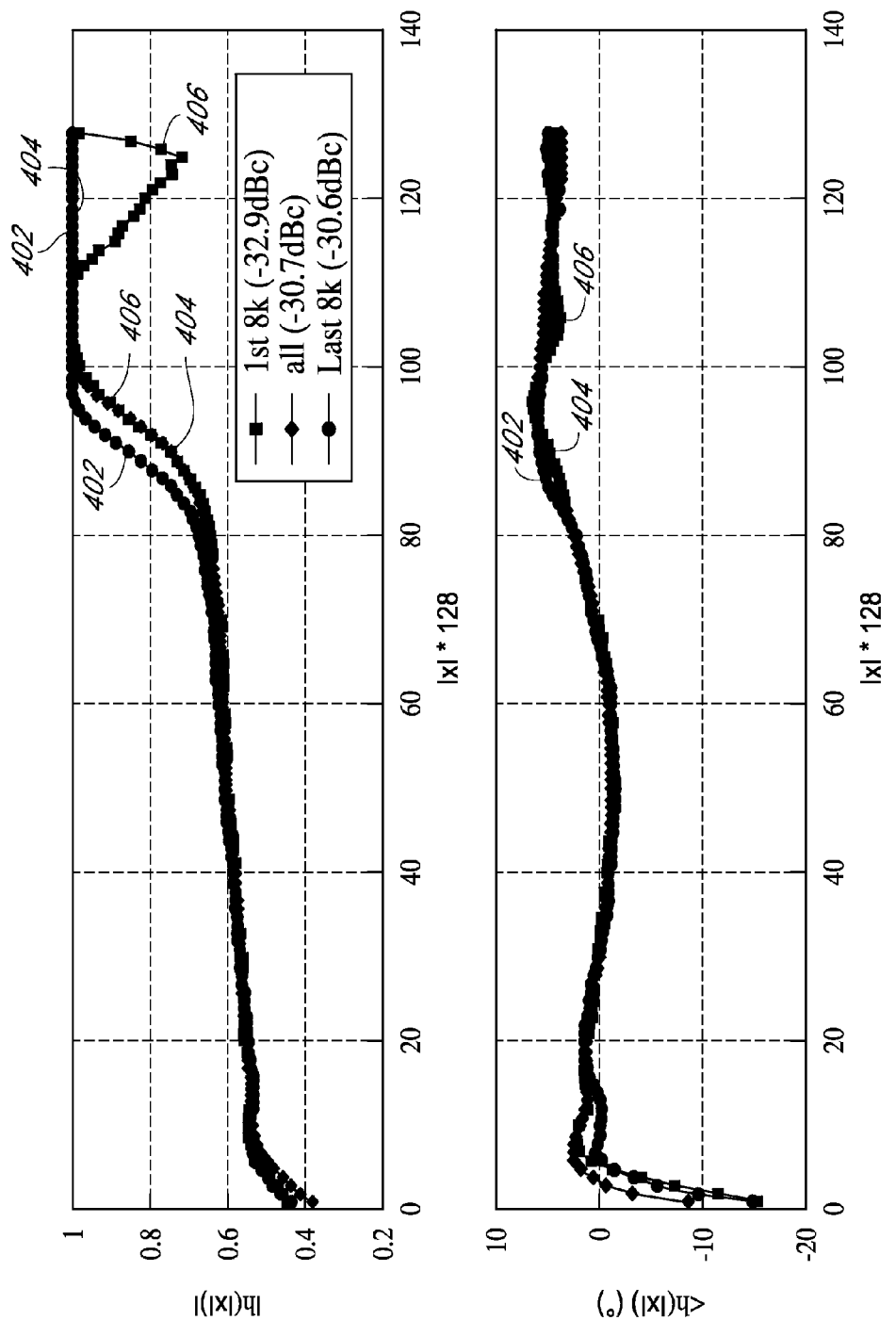
FIG. 4 illustrates a complex lookup table (LUT) for the three capture mechanisms: first 8000 samples, last 8000 samples, all samples.

The operation of one embodiment of the adaptive estimator 130 is expressed by Equations 8 and 9. A combined predistorter/adaptive estimator structure is illustrated in FIG. 4.

$$S_{i,n+1} = S_{i,n} - \alpha \cdot e_{scale}(|V_m(t)|^2) \tag{Eq. 8}$$

$$R_{i,n+1} = R_{i,n} - \alpha \cdot e_{rotate}(|V_m(t)|^2) \tag{Eq. 9}$$

In Equations 8 and 9, $\alpha$ is the update gain, which controls the rate of convergence and is usually restricted to be less than unity, and the subscript "i" refers to a specific table entry. This iteration occurs when the complex modulation envelope traverses a given table entry. When a new rotate factor $R_{inew}$ and a new scale $S_{inew}$, factor are estimated, they are recombined to form the complex gain of the predistorter, $F\{|V_m(t)|^2\}$, and stored in the lookup table. This technique is directly analogous to proportional and integral feedback familiar to control engineers.

The foregoing is a synopsis of the principles utilized in the design and operation of a complex baseband predistortion linearizer that may be employed with a non-linear amplifier. For further information, see Andrew S. Wright and Willem G. Durtler, *Experimental Performance of an Adaptive Digital Linearized Power Amplifier*, IEEE Trans. Vehicular Technology, Vol. 41, No. 4, November 1992. Also see Y. Nagata, *Linear Amplification Technique For Digital Mobile Communications*, in proc. IEEE Veh. Technology Conf., San Francisco, Calif., 1989, pp. 159-164, and see J. K. Cavers, *Amplifier Linearization Using A Digital Predistorter With Fast Adaptation And Low Memory Requirements*, IEEE Trans. Veh. Technol., Vol. 39, pp. 374-383, November 1990. Also see U.S. Pat. No. 5,049,832 to Cavers and U.S. Pat. No. 5,867,065 to Leyendecker.

Within a common theme of predistortion of bursty data as encountered in time-division duplex systems, 3 separate techniques are disclosed. These techniques can be applied independently of each other or can be combined. A control circuit 132 can control operation of the predistorter 106 or the adaptive estimator 130 according to one or more of the 3 techniques. A first technique relates to adaptation by an adaptive estimator 130 (FIG. 1) using only a smaller subset of samples than all the samples available for use for adaptation. A second technique is related to selective application of digital predistortion from the predistorter 106 (FIG. 1). A third technique is directed to adaptation by the adaptive estimator 130 of less than all of the coefficients of a lookup table of the predistorter 106. The predistorter 106 is typically implemented in hardware, such as in a field programmable gate array (FPGA), an application specific integrated circuit (ASIC) or the like. The adaptive estimator 130 can be implemented by hardware, by software/firmware, or by a combination of hardware and software/firmware.

Adaptation Using Only a Smaller Subset of Samples of a Burst

In a conventional predistortion system, the system performs adaptation as often, as fast, and on as many data samples as possible. A predistorter 106 (FIG. 1) typically has a predistortion lookup table, which stores coefficients that are used to complement a power amplifier's distortion such that the output of the power amplifier is relatively undistorted. These coefficients typically need to be adapted over time to account for changes in the amplifier's distortion characteristics.

In a first technique, adaptation is performed using only a smaller subset of samples taken during a burst. When some characteristics are already known, this smaller subset may be selected to be the region of a burst in which the power amplifier (PA) is known to exhibit the worst distortion after the start of the burst. For example, a preamble of a burst can contain higher power or more demanding modulation than the rest of the burst.

For example, it has been experimentally observed that this smaller subset is typically the initial segment of the burst where the power amplifier (PA) has still has not yet had sufficient time to settle fully into its new state as a result of the burst, i.e., the power amplifier (PA) is still in a transient condition relative to steady-state operation. This example is not intended to be limiting, but is merely illustrative of the principles behind the identification of possible subsets where this technique may be advantageous. One benefit is that power is saved by running the adaptation with a low duty cycle. This reduction in consumed power is particularly important for mobile and handheld applications with limited stored energy available. It has also been observed that simultaneously, digital predistortion (DPD) performance can be improved as the identified portion of the burst excites the amplifier nonlinearity in such a way that the coefficients adapted only during the identified portion of the burst deliver the same or better performance as those obtained adapting over the entire burst.

Experimental results showing the effect of limiting the adaptation to different subsets of a burst will be described in connection with FIGS. 2, 3, and 4. FIG. 2 is a chart showing signal amplitude (vertical axis) and time (horizontal axis). The entire frame of data is transmitted as a burst from approximately 2050 microseconds (μs) to approximately 4150 μs. Conventionally, the digital predistortion (DPD) parameters would be adapted throughout the entire burst, that is, all the samples from about 2050 μs to about 4150 μs would be processed by digital predistortion (DPD) adaptation and used to derive an update to the coefficients of the lookup table to improve the linearity of the amplifier.

A beginning subset of about 8000 samples from about 2050 μs to about 2200 μs or an ending subset of about 8000 samples from about 3975 μs to about 4150 μs are illustrated as possible examples for digital predistortion (DPD) adaptation. Adapting within one or more of these smaller subsets rather than over all of the available samples of the burst reduces adaptation time significantly. This can also help to conserve battery life. In one embodiment, the smaller subset consists of 5-15% of the samples of a burst.

FIG. 3 shows the spectral performance, averaged over 500 frames, for the previously described three different choices of digital predistortion (DPD) adaptation subset (initial 8000 samples, all samples, and final 8000 samples). Power spectral density (PSD) is expressed along the vertical axis. Frequency is expressed along the horizontal axis. No significant difference in spectral performance is observed between adapting on all of the samples and adapting only the first 8000 samples. When the last 8000 samples are used for adaptation, a small degradation is observed.

The averaged error vector magnitude is also recorded for the three methods and shows a significant 2 dB improvement for the case where only on the first 8000 samples are adapted compared to adapting on all available samples. These results demonstrate that a technique of adapting the digital predistortion (DPD) parameters only on a select smaller subset of the available training data (in this case the initial portion of the frame) improves upon the current state of the art. An amplifier's nonlinearity changes over the course of a burst such that only the worst distortion at the beginning of the burst needs to be captured by the digital predistortion (DPD) adaptation.

In an alternative embodiment, the smaller subset corresponds to a region of the burst that is expected to encounter the most distortion when amplified. In an alternative embodiment, the smaller subset corresponds to a region of the burst requiring the lowest error vector magnitude. In an alternative embodiment, the smaller subset corresponds to a region of the burst that is to be amplified to the highest output power within the burst.

FIG. 4 illustrates an example of corresponding adapted data within complex look-up-tables of pre-distortion coefficients. For example, the data can be generated by the adaptive estimator 130 (FIG. 1) and stored in a lookup table of the complex gain predistorter 106 (FIG. 1). The upper graph has coefficient data for AM-AM nonlinearity. The lower graph has coefficient data for AM-PM nonlinearity. Bin numbers are expressed along a horizontal axis, with the bin number increasing to the right. In the illustrated embodiment, the lookup table is indexed by magnitude, which is represented by the bin number. Coefficient values are expressed along the vertical axis with magnitude on the upper chart and phase on the lower chart.

These data within these lookup tables illustrate predistortion coefficients that are markedly different for AM-AM nonlinearities (upper chart) but similar for AM-PM nonlinearities (lower chart). The coefficients 402 AM-AM curve when adapted on the last portion of the burst shows that the nonlinearity begins at bin 80 rather than bin 85, as encountered when adaptation occurs over the entire burst (coefficients 404) or over the first portion (coefficients 406) of the burst. These coefficients 402 for the lookup table also saturate in a manner similar to the coefficients 404 for the lookup table obtained when adapting on all of the data. The coefficients 406 for the lookup table obtained when adapting only at the start of the burst has less nonlinearity in that it begins at bin 85, but the coefficients 406 are different from the coefficients 404 for the adaptation over the full burst case in that the upper bins of the table do not fully saturate.

This absence of saturation effectively digitally clips the signal which is the reason for the improved error vector magnitude (EVM) observed when only the initial portion of the burst is used for digital predistortion (DPD) adaptation. Typically such digital clipping causes significant spectral regrowth, but because a typical adaptation algorithm cost function reduces both the error vector magnitude and the spectral regrowth, this undesirable outcome is avoided. Furthermore, this benign clipping behavior is obtained without any additional circuitry other than the introduction of a gate to control when adaptation occurs.

For current and future envisaged power amplifier (PA) art, the upper portion (higher bin) of the digital predistortion (DPD) coefficient table is critical to predistorter performance and is the source of the other two techniques described.

Selective Application of Digital Predistortion

In a conventional predistortion system, the predistorter is always active, that is, is always predistorting a reference signal $V_m(t)$ 104 (FIG. 1) to generate a predistorted baseband complex modulation envelope.

If it is known a priori from analysis of a particular burst or the reference signal $V_m(t)$ 104 or can be estimated that the burst to be transmitted through the power amplifier (PA) 118 will not be exercising certain digital predistortion (DPD) parameters, then the circuitry or mechanisms associated with applying those parameters can be suitably deactivated or held in a low power state.

For example, if it is known that transmission of a particular frame would not result in a peak amplitude which would exercise the subset of the digital predistortion (DPD) parameters associated with rapid variation of digital predistortion (DPD) parameters (across input amplitude), then the application of the digital predistortion (DPD) for that frame may be replaced with a suitable simple gain scaling or, in the extreme case, avoided altogether (pass through).

In another example, the transmit power is known a priori to an associated transmitter. For example, in many wireless communication systems, a power control loop is used to control the gain of an amplifier, thereby controlling an output power. This is typically performed to achieve a desired signal to noise ratio. If the requested transmit power is known to be low, such as, below a threshold, for particular bursts, predistortion can be deactivated, which saves the computational power of predistorting the burst. This can be implemented by monitoring a requested gain for the power amplifier and determining whether to apply predistortion or not based on a comparison between the requested gain and a threshold.

In another example, predistortion can be deactivated for a particular burst based on the power amplifier's characteristics. After adaptation, the general characteristics of the power amplifier 118 will be known. For example, the coefficients of the lookup table will vary based on the nonlinearity of the power amplifier 118. The general characteristics can also be stored after a production test procedure. There can be regions of amplifier power where it is known that the amplifier is relatively linear and predistortion is not needed for a particular burst and power level. The power level can be associated with a gain level.

This technique is effective in reducing power consumption when the predistortion trigger occurs relatively infrequently. For example, digital predistortion (DPD) can be applied only when the requested transmit power is above a certain threshold chosen to represent the maximum transmit power for which the uncompensated power amplifier (PA) distortion is deemed to be tolerable. In many applications, such as mobile and cellular with high signal peak-to-average power ratios, this technique saves power since peak power amplifier output power is typically relatively infrequently exercised by the signal within the burst so that the digital predistortion (DPD) circuitry will accordingly be relatively infrequently activated. Note that this example of power thresholding is intended to be illustrative only and is not intended to be limiting. In one embodiment, the power thresholding is at least 6 decibels below the maximum transmit power.

Adaptation of Less than all of the Coefficients

In a conventional predistortion system, adaptation occurs over all of the predistortion coefficients of the lookup table. This can consume a relatively large amount of time and power, which can be important in a battery-powered device.

Upon initialization, there should not be a limit to the extent to which a lookup table is adapted. The lookup table should be adapted to achieve at least initial convergence. Convergence can be an iterative process and the achievement of convergence can be determined by, for example, when the error ceases to become noticeably smaller and/or when the error becomes relatively small, such as below a threshold. It will be understood that depending on operating conditions at the time, less than the entire lookup table may be exercised and adapted. For example, the lookup table can be conceptually divided into two or more portions, wherein a first portion covering the peak power predistortion is regularly updated, and a second portion for less power is not regularly updated. In addition, it may be desirable to adapt the entire lookup table without limits after a significant change in operating condition has been encountered so that the second portion is momentarily updated. Examples of significant changes include changes to operating temperature, changes in battery voltage, transitioning from battery power to line power, or vice-versa, and the like.

Under other conditions, adaptation can be limited to a selected smaller subset of coefficients. This can offer several benefits, such as saving processing time and battery power.

As illustrated by the experimental results, certain digital predistortion (DPD) parameters are effective and relatively invariant to the power amplifier (PA) operating condition. In the experimental data described earlier, this relative invariance is observed in the digital predistortion (DPD) coefficients that are of lower bin (towards the left of the charts in FIG. 4), which correspond to exercising the power amplifier (PA) at relatively low input amplitude levels. In one embodiment, adaption is not performed and the power that would be consumed for adaptation is avoided by avoiding adaptation of that lower subset of digital predistortion (DPD) coefficients after initial convergence until some significant change in operating conditions is encountered.

In one embodiment, the general characteristics of the power amplifier (PA) 118 are known, and the threshold for determining to which bin level is also known.

For example, with reference to FIG. 4, bins 60 and below show relatively little change and should not need to be adapted very often. At low power levels corresponding to low bin numbers, the spectral growth from distortion is also relatively low power and can typically be tolerated. Other applicable thresholds will be readily determined by one of ordinary skill in the art. For example, in the magnitude-indexed lookup table illustrated in FIG. 4, only the upper bins of the lookup table corresponding to higher signal input amplitudes are regularly adapted.

The techniques disclosed herein are applicable to a variety of applications including, but not limited to, wideband third and fourth generation communication systems such as WiMAX. These systems have RF transceivers that are preferably relatively linear and relatively power efficient. The design is also applicable to other commercial systems such as point-to-point, point-to-multipoint, wireless local loop, multichannel multipoint distribution service (MMDS) and local multipoint distribution service (LMDS) wireless systems. The approach is also applicable to existing cellular systems that use TDD. The techniques can also find relatively broad use in the satellite, cable broadcast and terrestrial broadcast industries, where linear amplification is desired. For example, the techniques can be applied to digital radio and television signals, which use amplification with relatively low distortion.

The disclosed techniques can simultaneously provide low-power and high-performance for mobile station and base station predistortion systems. It exploits the time-dependent physical response of a power amplifier 118 to obtain an effective predistortion function with a minimum of power consumption.

Various embodiments have been described above. Although described with reference to these specific embodiments, the descriptions are intended to be illustrative and are not intended to be limiting. Various modifications and applications may occur to those skilled in the art.

What is claimed is:

1. An apparatus for RF power amplifier predistortion, the apparatus comprising:
a predistorter configured to receive a reference signal, the predistorter configured to predistort the reference signal to generate a predistorted signal, wherein the reference signal contains information in discrete bursts for transmission in a time-division duplex (TDD) network; and
an adaptive estimator configured to receive an observed signal that is derived from an output of an RF power amplifier, wherein the adaptive estimator is also configured to receive the reference signal, wherein the adaptive estimator is configured to update one or more coefficients of the predistorter based on only a smaller subset of samples of the bursts for the reference signal and for the observed signal than all of the samples, wherein the smaller subset corresponds to a region of the burst that is expected to encounter the most distortion when amplified.

2. The apparatus of claim 1, wherein a burst comprises at least a payload of data.

3. The apparatus of claim 1, wherein the smaller subset of samples is selected to end before the RF power amplifier has achieved steady state operation.

4. The apparatus of claim 3, wherein the smaller subset of samples is selected to start at a beginning of a burst.

5. The apparatus of claim 1, wherein the smaller subset consists of only about a 5-15% of samples of a burst.

6. The apparatus of claim 5, wherein the smaller subset is selected to start at a beginning of a burst.

7. The apparatus of claim 5, wherein the burst further comprises an overhead portion, wherein the smaller subset comprises at least a preamble of the burst.

8. An apparatus for RF power amplifier predistortion, the apparatus comprising:
a predistorter configured to receive a reference signal, the predistorter configured to predistort the reference signal to generate a predistorted signal, wherein the reference signal contains information in discrete bursts for transmission in a time-division duplex (TDD) network; and
an adaptive estimator configured to receive an observed signal that is derived from an output of an RF power amplifier, wherein the adaptive estimator is also configured to receive the reference signal, wherein the adaptive estimator is configured to update one or more coefficients of the predistorter based on only a smaller subset of samples of the bursts for the reference signal and for the observed signal than all of the samples, wherein the smaller subset corresponds to a region of the burst requiring the lowest error vector magnitude.

9. An apparatus for RF power amplifier predistortion, the apparatus comprising:
a predistorter configured to receive a reference signal, the predistorter configured to predistort the reference signal to generate a predistorted signal, wherein the reference signal contains information in discrete bursts for transmission in a time-division duplex (TDD) network; and
an adaptive estimator configured to receive an observed signal that is derived from an output of an RF power amplifier, wherein the adaptive estimator is also configured to receive the reference signal, wherein the adaptive estimator is configured to update one or more coefficients of the predistorter based on only a smaller subset of samples of the bursts for the reference signal and for the observed signal than all of the samples, wherein the smaller subset corresponds to a region of the burst that is to be amplified to the highest output power within the burst.

10. A method of reducing distortion in a RF power amplifier, the method comprising:
receiving a reference signal, wherein the reference signal contains information in discrete bursts for transmission in a time-division duplex (TDD) network;
predistorting the reference signal with a set of predistortion coefficients to generate a predistorted signal, wherein a predistortion characteristic is intended to be complementary to a distortion of an RF power amplifier;
receiving an observed signal, wherein the observed signal is derived from an output of the RF power amplifier; and
adaptively updating one or more coefficients of the set of predistortion coefficients based at least partly on a comparison between selected samples of the reference signal and the observed signal, wherein the selected samples consist of only a smaller subset of samples of the bursts for the reference signal and for the observed signal than all of the samples, wherein the smaller subset corresponds to a region of the burst that is expected to encounter the most distortion when amplified.

11. The method of claim 10, wherein a burst comprises at least a payload of data.

12. The method of claim 10, wherein the smaller subset of samples is selected to end before the RF power amplifier has achieved steady state operation.

13. The method of claim 12, wherein the smaller subset of samples is selected to start at a beginning of a burst.

14. The method of claim 10, wherein the smaller subset consists of only about a 5-15% of samples of a burst of information.

15. The method of claim 14, wherein the smaller subset is selected to start at a beginning of the burst.

16. The method of claim 14, wherein the burst further comprises an overhead portion, wherein the smaller subset comprises at least a preamble of the burst.

17. A method of reducing distortion in a RF power amplifier, the method comprising:
receiving a reference signal, wherein the reference signal contains information in discrete bursts for transmission in a time-division duplex (TDD) network;
predistorting the reference signal with a set of predistortion coefficients to generate a predistorted signal, wherein a predistortion characteristic is intended to be complementary to a distortion of an RF power amplifier;
receiving an observed signal, wherein the observed signal is derived from an output of the RF power amplifier; and
adaptively updating one or more coefficients of the set of predistortion coefficients based at least partly on a comparison between selected samples of the reference signal and the observed signal, wherein the selected samples consist of only a smaller subset of samples of the bursts for the reference signal and for the observed signal than all of the samples, wherein the smaller subset corresponds to a region of the burst requiring the lowest error vector magnitude.

18. A method of reducing distortion in a RF power amplifier, the method comprising:
receiving a reference signal, wherein the reference signal contains information in discrete bursts for transmission in a time-division duplex (TDD) network;
predistorting the reference signal with a set of predistortion coefficients to generate a predistorted signal, wherein a predistortion characteristic is intended to be complementary to a distortion of an RF power amplifier;
receiving an observed signal, wherein the observed signal is derived from an output of the RF power amplifier; and
adaptively updating one or more coefficients of the set of predistortion coefficients based at least partly on a comparison between selected samples of the reference signal and the observed signal, wherein the selected samples consist of only a smaller subset of samples of the bursts for the reference signal and for the observed signal than all of the samples, wherein the smaller subset corresponds to a region of the burst that is to be amplified to the highest output power within the burst.

19. An apparatus for RF power amplifier predistortion, the apparatus comprising:
a predistorter configured to receive a reference signal and configured to be able to predistort the reference signal to generate a predistorted signal, wherein the reference signal contains information in discrete bursts for transmission in a time-division duplex (TDD) network; and
a control circuit coupled to the predistorter, the control circuit configured to determine whether predistortion is to be applied to a particular burst based at least partly on a peak RF power level of an RF burst associated with the particular burst, and to apply predistortion to the particular burst only when the peak RF power level exceeds a threshold, and not to apply predistortion to the particular burst when the peak RF power level is below the threshold.

20. The apparatus of claim 19, wherein the predistortion circuit is configured to switch among at least predistortion or a complete bypass of predistortion based on a state of a control signal from the control circuit.

21. The apparatus of claim 19, wherein the predistortion circuit is configured to select from among at least predistortion or simple gain scaling based on a state of control signal from the control circuit.

22. The apparatus of claim 19, wherein the threshold is at least 6 decibels below the maximum transmit power.

23. A method for control of RF power amplifier predistortion, the method comprising:
receiving a reference signal, wherein the reference signal contains information in discrete bursts for transmission in a time-division duplex (TDD) network;
determining whether predistortion is to be applied to a particular burst based at least partly on a peak RF power level of an RF burst associated with the particular burst, and to apply predistortion to the particular burst only when the peak RF power level exceeds a threshold, and not to apply predistortion to the particular burst when the peak RF power level is below the threshold; and
selectively predistorting the particular burst based on the determination, wherein a predistortion characteristic is intended to be complementary to a distortion of an RF power amplifier.

24. The method of claim 23, wherein selectively predistorting comprises selecting among at least predistorting or completely bypassing of predistortion.

25. The method of claim 23, wherein selectively predistorting comprises selecting from among at least predistortion or gain scaling.

26. The method of claim 23, wherein the threshold is at least 6 decibels below the maximum transmit power.

27. An apparatus for RF power amplifier predistortion, the apparatus comprising:
a predistorter configured to receive a reference signal and configured to predistort the reference signal to generate a predistorted signal, wherein the reference signal contains information in discrete bursts for transmission in a time-division duplex (TDD) network; and
an adaptive estimator configured to receive an observed signal that is derived from an output of an RF power amplifier, wherein the adaptive estimator is also configured to receive the reference signal, wherein the adaptive estimator is configured to update coefficients for both a first portion of coefficients and a second portion of coefficients of the predistorter until at least convergence is achieved, and is then configured to adaptively update the first portion of the coefficients and not to update the second portion of coefficients, the first portion comprising at least coefficients corresponding to peak amplitude operation, wherein there is no overlap between the first portion and the second portion.

28. The apparatus of claim 27, wherein the adaptive estimator is further configured to adaptively update the second portion momentarily upon determining that a change in operating condition has occurred.

29. A method of reducing distortion in a RF power amplifier, the method comprising:
receiving a reference signal, wherein the reference signal contains information in discrete bursts for transmission in a time-division duplex (TDD) network;

predistorting the reference signal with a set of predistortion coefficients to generate a predistorted signal, wherein a predistortion characteristic is intended to be complementary to a distortion of an RF power amplifier;

receiving an observed signal, wherein the observed signal is derived from an output of the RF power amplifier; and adaptively updating predistortion coefficients based at least partly on a comparison between samples of the reference signal and the observed signal, wherein the predistortion coefficients are divided into at least a first portion and a second portion, wherein both the first portion and the second portion are adaptively updated until initial convergence is achieved, and wherein only the first portion and not the second portion are adaptively adjusted thereafter, wherein the first portion comprises at least coefficients corresponding to peak amplitude operation.

30. The method of claim 29, wherein the second portion is also adaptively adjusted momentarily.

31. The apparatus of claim 8, wherein a burst comprises at least a payload of data.

32. The apparatus of claim 8, wherein the smaller subset of samples is selected to end before the RF power amplifier has achieved steady state operation.

33. The apparatus of claim 32, wherein the smaller subset of samples is selected to start at a beginning of a burst.

34. The apparatus of claim 8, wherein the smaller subset consists of only about a 5-15% of samples of a burst.

35. The apparatus of claim 34, wherein the smaller subset is selected to start at a beginning of a burst.

36. The apparatus of claim 34, wherein the burst further comprises an overhead portion, wherein the smaller subset comprises at least a preamble of the burst.

37. The apparatus of claim 9, wherein a burst comprises at least a payload of data.

38. The apparatus of claim 9, wherein the smaller subset of samples is selected to end before the RF power amplifier has achieved steady state operation.

39. The apparatus of claim 38, wherein the smaller subset of samples is selected to start at a beginning of a burst.

40. The apparatus of claim 9, wherein the smaller subset consists of only about a 5-15% of samples of a burst.

41. The apparatus of claim 40, wherein the smaller subset is selected to start at a beginning of a burst.

42. The apparatus of claim 40, wherein the burst further comprises an overhead portion, wherein the smaller subset comprises at least a preamble of the burst.

43. The method of claim 17, wherein a burst comprises at least a payload of data.

44. The method of claim 17, wherein the smaller subset of samples is selected to end before the RF power amplifier has achieved steady state operation.

45. The method of claim 44, wherein the smaller subset of samples is selected to start at a beginning of a burst.

46. The method of claim 17, wherein the smaller subset consists of only about a 5-15% of samples of a burst of information.

47. The method of claim 46, wherein the smaller subset is selected to start at a beginning of the burst.

48. The method of claim 46, wherein the burst further comprises an overhead portion, wherein the smaller subset comprises at least a preamble of the burst.

49. The method of claim 18, wherein a burst comprises at least a payload of data.

50. The method of claim 18, wherein the smaller subset of samples is selected to end before the RF power amplifier has achieved steady state operation.

51. The method of claim 50, wherein the smaller subset of samples is selected to start at a beginning of a burst.

52. The method of claim 18, wherein the smaller subset consists of only about a 5-15% of samples of a burst of information.

53. The method of claim 52, wherein the smaller subset is selected to start at a beginning of the burst.

54. The method of claim 52, wherein the burst further comprises an overhead portion, wherein the smaller subset comprises at least a preamble of the burst.

* * * * *